United States Patent [19]
Vassiliou et al.

[11] 4,150,008
[45] Apr. 17, 1979

[54] FLUOROCARBON POLYMER-PIGMENT COATING COMPOSITIONS STABILIZED AGAINST DISCOLORATION

[75] Inventors: Eustathios Vassiliou, Newark, Del.; William Van Hoeven, Jr., Wallingford, Pa.

[73] Assignee: E. I. Du Pont de Nemours and Company, Wilmington, Del.

[21] Appl. No.: 820,683

[22] Filed: Aug. 2, 1977

Related U.S. Application Data

[63] Continuation-in-part of Ser. No. 775,279, Mar. 7, 1977, abandoned, which is a continuation-in-part of Ser. No. 570,951, Apr. 22, 1975, abandoned, which is a continuation-in-part of Ser. No. 457,638, Apr. 3, 1974, abandoned.

[51] Int. Cl.$^2$ ................... C08L 57/08; C08K 3/22
[52] U.S. Cl. ................... 260/29.6 F; 260/23 XA; 260/29.6 MM; 260/29.6 RB; 260/32.8 A; 260/33.6 F; 260/42.27; 260/45.75 R; 260/45.75 B; 260/45.75 M; 260/45.75 P; 260/900; 428/422; 428/426; 428/461; 428/539
[58] Field of Search ............... 260/29.6 F, 29.6 MM, 260/23 XA, 45.75 M, 45.75 P, 45.75 B, 45.75 R, 29.6 RB, 32.84, 33.6 F, 42.27; 428/422, 426, 461, 539

[56] References Cited
U.S. PATENT DOCUMENTS

| | | | |
|---|---|---|---|
| 2,075,543 | 3/1937 | Reed et al. | 260/45.75 R |
| 2,681,324 | 6/1954 | Hochberg | 260/29.6 F |
| 2,784,170 | 3/1957 | Walter et al. | 260/45.75 R |
| 2,879,257 | 3/1959 | Walter et al. | 260/45.75 B |
| 2,888,364 | 5/1959 | Bauer, Jr. | 428/422 |
| 2,906,730 | 9/1959 | Honn | 260/45.75 M |
| 2,955,099 | 10/1960 | Mallouk et al. | 260/45.75 R |
| 2,961,341 | 11/1960 | Long | 428/422 |
| 3,419,522 | 12/1968 | Plimmer | 260/45.75 |
| 3,700,627 | 10/1972 | Miller | 260/45.85 |
| 4,079,033 | 3/1978 | Oswitch et al. | 260/45.75 P |

FOREIGN PATENT DOCUMENTS

| | | |
|---|---|---|
| 751265 | 6/1956 | United Kingdom. |
| 961671 | 6/1964 | United Kingdom. |
| 1222530 | 2/1971 | United Kingdom. |
| 1358428 | 7/1974 | United Kingdom. |

*Primary Examiner*—H. S. Cockeram

[57] ABSTRACT

The discoloration of finishes derived from coating compositions containing
(a) fluorocarbon polymer, along with
(b) pigment, and
(c) a liquid carrier, can be significantly reduced by adding to the composition, before it is applied, a compound which decomposes to an oxide or hydroxide of a particular metal.

13 Claims, No Drawings

FLUOROCARBON POLYMER-PIGMENT COATING COMPOSITIONS STABILIZED AGAINST DISCOLORATION

CROSS-REFERENCE TO RELATED APPLICATIONS

This application is a continuation-in-part of application Ser. No. 775,279 filed Mar. 7, 1977, which is a continuation-in-part of application Ser. No. 570,951 filed Apr. 22, 1975, which in turn is a continuation-in-part of application Ser. No. 457,638 filed Apr. 3, 1974 all now abandoned.

BACKGROUND OF THE INVENTION

Cookware coated with fluorocarbon polymers of various sorts has come into widespread use in recent years. Most housewives prefer to use such cookware in their kitchens, because food is less likely to stick to it than to uncoated cookware and because it is so easy to clean.

These fluorocarbon polymer coatings are ordinarily provided in various colors. The darker ones of these are generally satisfactory; but the lighter colors, especially white and unpigmented, tend to be discolored or gray because of carbonaceous residues of the various adjuncts and surfactants originally present in the compositions from which the coatings are derived.

SUMMARY OF THE INVENTION

This discoloration or grayness can be significantly reduced and the purity of the color enhanced by using as the coating composition
  (a) about 25%–96%, by weight of the total of (a) and (b), of a fluorocarbon polymer of monoethylenically unsaturated hydrocarbon monomers completely substituted with fluorine atoms or a combination of fluorine atoms and chlorine atoms, the polymer having a number average molecular weight of at least 20,000;
  (b) about 2%–75%, by weight of the total of (a) and (b), of pigment; the amounts of (a) and (b) totaling 100%;
  (c) enough of at least one compound of at least one of the metals

| | |
|---|---|
| cobalt | cerium |
| iron | and |
| bismuth | manganese | which compound decomposes in the temperature range of about 100° C.–500° C. to give at least 0.2%, by weight of the metal in the compound, of an oxide or hydroxide,
to provide at least about 0.005 parts of metal per hundred of (a);
and
  (d) a liquid carrier.

DETAILED DESCRIPTION OF THE INVENTION

It will be obvious that those metal compounds toxic to humans should not be used in products that will come in contact with food. Such compounds should be restricted to other industrial uses.

Typical of the metal compounds useful in the invention are the nitrates, nitrites and the salts and half salts of saturated and unsaturated monobasic or dibasic organic acids, preferably of 1–20 carbon atoms, for example, the acetates and octoates. The compounds can also be in anionic form.

Cerium compounds are most preferred for their effectiveness in reducing discoloration derived from organic residues. These compounds can be in the +3 or the +4 valence state. Especially preferred are cerium nitrates, cerous acetate and cerous 2-ethyl hexanoate. Cobalt compounds seem to be most effective in oxidizing elemental carbon.

The concentration of metal compound in the composition will be dictated by the nature of the compound, the amount of discoloration expected in the final finish and the degree to which this discoloration is to be reduced. In the general case, the metal compound will be present at a concentration which will provide about 0.005–5 parts of metal per hundred parts of fluorocarbon polymer used. When the discoloration is great, more than 5 parts of metal compound may be used. Indeed, the amount of metal compound that can be used may be limited by the color the compound itself gives to the final product and the point at which this color is unacceptable.

The fluorocarbon polymers used in the composition are those of monoethylenically unsaturated hydrocarbon monomers completely substituted with fluorine atoms or a combination of fluorine atoms and chlorine atoms. Included in this group are perfluoroolefin polymers such as polytetrafluoroethylene (PTFE) and copolymers of tetrafluoroethylene and hexafluoropropylene in all monomer unit weight ratios, fluorochlorocarbon polymers such as polymonochlorotrifluoroethylene, and copolymers of tetrafluoroethylene and perfluoroalkyl vinyl ethers (PFA), which themselves are also included in the invention as equivalent to the other fluorocarbon polymers. Mixtures of these can also be used. PTFE is preferred for its thermal stability.

The fluorocarbon polymers used are particulate. The particles are preferably small enough to pass through the nozzle of a spray gun without clogging it and also small enough to give the resulting film integrity.

The fluorocarbon polymer should have a number average molecular weight of at least about 20,000, for a polymer with a molecular weight of less than this tends to be waxy and unsuited for use. The number average molecular weight is preferably at least 200,000. Number average molecular weight of PTFE is measured by the method described by Suwa, Takehisa and Machi in *Journal of Applied Polymer Science*, Volume 17, pp. 3253–3257 (1973). The number average molecular weight of a tetrafluoroethylene/hexafluoropropylene copolymer is measured by first determining its melt flow rate (MFR) according to ASTM D2116, using the MFR to determine melt viscosity (MV) according to the equation $$MV = \frac{pi \times \text{pressure used (mm)} \times \text{orifice radius (mm)}}{8 \times MFR \times \text{orifice length (mm)}}$$

and then determining molecular weight (MW) according to the equation $$MW = \sqrt[3.4]{\frac{MV}{1.62 \times 10^{-13}}}$$

Number average molecular weight of a fluorochlorocarbon polymer is measured by ASTM D1430.

Although a powder of fluorocarbon polymer can be used and a carrier provided separately, a polymer in the form of an aqueous surfactant-stabilized dispersion is preferred for its stability and because it is most easily obtained in that form. Dispersions of fluorocarbon polymers in organic liquids such as alcohols, ketones, aliphatic or aromatic hydrocarbons, or mixtures of these, can also be used. In either case, the liquid generally serves as the carrier for the composition.

The fluorocarbon polymer is ordinarily present in the composition at a concentration of about 25%–98%, preferably about 70%–95%, by weight of the total of fluorocarbon polymer and pigment.

Films having greater density, lower porosity and better coalescence than usual can be obtained by adding a polymeric adjunct to the composition from which the film is derived.

Broadly speaking, this polymeric adjunct can be any polymer of monoethylenically unsaturated monomers which depolymerizes, and whose depolymerization products vaporize, in the temperature range of from about 150° C. below the fusion temperature of the fluorocarbon polymer used to about the fluorocarbon polymer's decomposition temperature. The closer the depolymerization and vaporization temperatures of the adjunct are to the fluorocarbon polymer's fusion temperature, the better.

"Depolymerization" means degradation of the polymer to the point at which the degradation products are volatile at the temperatures encountered in fusing the final film. These degradation products can be monomers, dimers or oligomers.

"Vaporize" means volatilization of the degradation products and their evaporation from the final film. Ideally, all of the degradation products pass from the film, but as a practical matter, a small but insignificant amount generally remains.

Typical of the polymeric adjuncts which can be used are polymers and copolymers (meaning they contain two or more different types of monomer units) of monoethylenically unsaturated monomers, which polymers and copolymers contain one or more monoethylenically unsaturated acid units.

Representative of these monoethylenically unsaturated monomers are alkyl acrylates and alkyl methacrylates having 1–8 atoms in the alkyl group, styrene, α-methyl styrene and vinyl toluene. Polymers of alkyl acrylates and alkyl methacrylates are preferred because their decomposition temperatures are close to the fusion temperature of PTFE.

Representative of the monoethylenically unsaturated acid units are those derived from acrylic acid, methacrylic acid, fumaric acid, itaconic acid and maleic acid (or anhydride). Acrylic acid and methacrylic acid are preferred because of their availability. The acid units of these polymers can optionally be esterified with glycidyl esters of 4–14 carbon atoms (total).

The glycidyl ester preferred for its availability is a product sold by the Shell Chemical Company as "Cardura E" ester. This is a mixed ester of the general formula

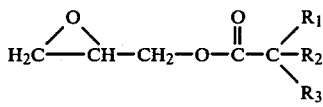

where $R_1$ is $CH_3$
and
$R_2$ and $R_3$ are lower alkyl groups,
$R_1$, $R_2$ and $R_3$ containing a total of 7–9 carbon atoms.

The polymeric adjuncts preferred for use for the better coalescence they confer to films during the curing stage are 1. methyl methacrylate/2-ethylhexyl acrylate/methacrylic acid terpolymers, preferably the 35–50/40–60/1–15 (weight ratio) terpolymers;
2. butyl acrylate/methyl methacrylate/"Cardura E"/acrylic acid quadripolymers, preferably the 23–27/33–37/21–25/15–19 quadripolymers;
3. styrene/methyl methacrylate/"Cardura E"/acrylic acid quadripolymers, preferably the 28–32/28–32/21–25/15–19 quadripolymers;
4. methyl methacrylate/ethyl acrylate/methacrylic acid terpolymers, preferably the 30–45/45–60/1–15 terpolymers.

Mixtures of the adjuncts can also be used.

The polymeric adjunct or the pigment, or both together, are ordinarily present in a composition at a concentration of about 2%–75%, by weight of the total of fluorocarbon polymer, pigment and adjunct polymer, preferably about 5%–30%.

The polymeric adjunct can be made by any of the conventional free-radical techniques familiar to any polymer chemist and can be added to the composition as a solution or emulsion, as made. The presence of this adjunct in the coating composition is preferred because of the enhanced density, porosity and colescense it gives to films.

Any pigment ordinarily used in fluoropolymer coating compositions can be used in a composition of the invention, although the benefits of the invention are minimized if darker pigments are employed. White pigments are preferred for their appearance. Typical of these are titanium dioxide, aluminum oxide and silica. Titanium dioxide is especially preferred for its hiding power.

The composition can also contain such conventional additives as flow control agents, surfactants, plasticizers, coalescing agents, etc., as are necessary or seem desirable. These additives are added for the usual reasons, in the usual ways and in the usual amounts.

The amount of total solids in the coating composition will be governed by the substrate to which the composition is to be applied, the method of application, the curing procedures, and like factors. Ordinarily, the composition will contain about 10%–80%, by weight, of total solids.

The composition is made by first selecting the fluorocarbon polymer, polymeric adjunct, pigment, metal compound, and such conventional additives as may be used, and the amounts of these best suited to the purpose. This can be done with no trouble by one skilled in this art, using well-known principles of formulation. Preparation of the composition is then a simple matter of making a mill base with the pigment (using standard techniques well known in the art), mixing the metal compound and this mill base and then mixing the mill base and the other components. If no pigment is used, the composition is prepared by simply mixing the components.

The composition will be most useful for top-coating glass and metal cookware, especially frypans, but it can be used just as well on other glass or metal articles requiring lubricious or non-stick or release surfaces, such as bearings, valves, wire, metal foil, boilers, pipes, ship bottoms, oven liners, iron soleplates, waffle irons, ice cube trays, snow shovels and plows, chutes, conveyors, dies, tools such as saws, files and drills, hoppers and other industrial containers and molds.

The composition can be applied in any of the customary ways. Spraying, roller-coating, dipping, doctor-blanding—all are suitable, although spraying is generally the method of choice.

The article to be coated is preferably pretreated by grit-blasting, by the flame-spraying of metals or by frit-coating and then primed.

The composition is ordinarily applied to a thickness of about 10–130 microns (dry) and then baked for a time and at a temperature sufficient to fuse the fluorocarbon polymer being used.

Those skilled in this art will be able to practice this invention more easily by first referring to the following illustrative and representative Examples.

In the Examples, all parts and percentages are by weight.

EXAMPLE 1

(1) Prepare a mill base by mixing in order and then pebble milling

| water | 223.02 parts |
|---|---|
| sodium polynaphthalene sulfonate | 2.00 |
| titanium dioxide | 180.86 |

(2) Dissolve 23.39 parts of $Ce(NO_3)_3.6H_2O$ in (1).

(3) With mixing, slowly add the product of (2) to 2853.9 parts of a dispersion of PTFE in water, 60% solids, containing 6% (by weight) of isooctylphenoxypolyethoxyethanol. ("Teflon" ® TFE-Fluorocarbon Resin, Aqueous Dispersion, T-30, E. I. du Pont de Nemours and Company).

| (4) Mix, in order, | |
|---|---|
| triethanolamine | 120.2 parts |
| oleic acid | 72.8 |
| toluene | 214.94 |
| butyl carbitol | 72.1 |

(5) Slowly add the product of (4) to the product of (3) with mixing.

(6) To the product of (5), slowly add, with mixing, 625.8 parts of an aqueous dispersion, 40% solids, of a methyl methacrylate/ethyl acrylate/methacrylic acid 39/57/4 terpolymer.

(7) To the product of (6), slowly add, with mixing, 39.3 parts of water.

Spray the resulting composition, to a thickness of 25 microns (dry), on a frit-coated aluminum pan, primed as follows:

A. The following were mixed together:

| PTFE dispersion aqueous, 60% solids | 478.76 parts |
|---|---|
| Deionized water | 130.23 parts |
| Colloidal silica sol, 30% solids in water ("Ludox AM" colloidal silica, E. I. du Pont de Nemours and Company) | 327.18 parts |

B. The following were separately mixed:

| "Triton X-100" (Non-ionic surfactant sold by Rohm & Haas Co.) | 17.52 parts |
|---|---|
| Toluene | 34.56 parts |
| Butyl Carbitol | 13.36 parts |
| Silicone (Dow Corning DC-801, 60% solids in xylene) | 34.56 parts |

85.52 parts of (B) were added to (A) in a small stream, with stirring, over a 2–3 minute period. To this were then added, with stirring,

| $TiO_2$ (45% solids dispersion in water) | 35.46 parts |
|---|---|
| Channel black (22% solids dispersion in water | 0.85 parts |

Stirring was continued for 10–20 minutes. The resulting composition was then sprayed to a frit-coated aluminum fry pan to a thickness of 0.2–0.6 mil (dry), dried in air, and then baked for 5 minutes at 430° C.

The resulting white finish will show significantly less discoloration than the same finish lacking the cerous nitrate.

EXAMPLE 2

(1) Prepare a mill base by mixing in order and pebble milling

| water | 45.43 parts |
|---|---|
| triethanolamine | 4.57 |
| oleic acid | 2.29 |
| $TiO_2$ | 45.43 |

| (2) Mix in order | |
|---|---|
| toluene | 55.96 |
| butyl Carbitol | 18.83 |
| triethanolamine | 26.70 |
| oleic acid | 16.62 |
| cerous 2-ethylhexanoate solution (50% in 2-ethyl hexanoic acid | 4.99 |

(3) To 717.21 parts of the PTFE dispersion of Example 1(3), add 12.96 parts of water, with mixing.

(4) Add the product of (1) to the product of (3), with mixing.

(5) Slowly add the product of (2) to the product of (4), with mixing. Continue mixing for 30 minutes.

(6) To the product of (5) add, with mixing, 157 parts of an aqueous dispersion, 40% solids, of a methyl methacrylate/ethyl acrylate/methacrylic acid 39/57/4 terpolymer.

Apply and bake the resulting composition on a primed substrate as in Example 1.

The resulting white finish will show significantly less discoloration than the same finish lacking the cerium compound.

EXAMPLE 3

Prepare a composition as in Example 2, omitting step (1). Apply and bake the composition as in Example 1.

The resulting clear finish will show significantly less discoloration than the same finish lacking the cerium compound.

EXAMPLES 4-8

Mix the following ingredients given in parts by weight in order:

| | | EXAMPLES | | | | |
|---|---|---|---|---|---|---|
| | | 4 | 5 | 6 | 7 | 8 |
| A. | PTFE dispersion of Example 1 (3) | 143.6 | 107.7 | 71.8 | 35.9 | — |
| B. | PFA dispersion (made up as in A) | — | 35.9 | 71.8 | 107.7 | 143.6 |
| C. | Deionized water | 3.04 | 3.04 | 3.04 | 3.04 | 3.04 |
| D. | White mill base* | 19.6 | 19.6 | 19.6 | 19.6 | 19.6 |
| E. | Catalyst solution** | 29.6 | 29.6 | 29.6 | 29.6 | 29.6 |
| F. | Acrylic latex terpolymer dispersion of Example 1 (6) | 26.7 | 26.7 | 26.7 | 26.7 | 26.7 |

*The white mill base is prepared by ball milling for 15 hours the following ingredients:

| | |
|---|---|
| Deionized water | 44% |
| Titanium dioxide | 44 |
| Triethanolamine | 8 |
| Oleic acid | 4 |

**The catalyst solution is prepared by mixing the following ingredients in order until a uniform solution is obtained:

| | |
|---|---|
| Butyl Carbitol | 12.1% |
| Triethanolamine | 36.1 |
| Toluene | 31.8 |
| Oleic acid | 10.5 |
| Cerous 2-ethyl hexanoate in 2-ethyl hexanoic acid (12% metal content) | 8.1 |
| Isooctylphenoxypolyethoxy-ethanol | 1.4 |

Panel Preparation

Five aluminum panels were fritted with a surface coverage of approximately 30%. They were then primed as in Example 1 and air dried. The panels were subsequently topcoated with formulations of Examples 4 to 8 to a dry film thickness of 25 microns, they were air dried and baked at 800° F. metal temperature for 2 minutes. All of the panels had acceptable white color.

We claim:

1. A composition suitable for making a light-colored fused fluorocarbon polymer coating, said composition consisting essentially of
 (a) about 25%-96%, by weight of the total of (a) and (b), of a fluorocarbon polymer polymerized or copolymerized from monomers selected from monoethylenically unsaturated hydrocarbon monomers and hydrocarbon ether monomers, said monomers being completely substituted with fluorine atoms or a combination of fluorine atoms and chlorine atoms, the polymer having a number average molecular weight of at least 20,000;
 (b) about 2%-75%, by weight of the total of (a) and (b), of pigment; the amounts of (a) and (b) totaling 100%;
 (c) enough of at least one compound of at least one of the metals

| | |
|---|---|
| cobalt | cerium |
| iron | and |
| | manganese | which compound decomposes in the temperature range of about 100° C.-500° C. to give at least 0.2%, by weight of the metal in the compound, of an oxide or hydroxide,
to provide at least about 0.005 parts of metal per hundred of (a); and
 (d) a liquid carrier.

2. The composition of claim 1 wherein the polymer in (a) is a perfluoroolefin polymer.

3. The composition of claim 2 wherein the perfluoroolefin polymer is polytetrafluoroethylene.

4. The composition of claim 3 wherein the compound in (c) is of cerium.

5. The composition of claim 4 wherein the cerium compound is a cerium nitrate, or a salt of cerium hydroxide and an organic acid.

6. The composition of claim 5 wherein the carrier is water.

7. An article bearing a fused coating of the composition of claim 1.

8. An article bearing a fused coating of the composition of claim 2.

9. An article bearing a fused coating of the composition of claim 3.

10. An article bearing a fused coating of the composition of claim 4.

11. An article bearing a fused coating of the composition of claim 5.

12. An article bearing a fused coating of the composition of claim 6.

13. A method for lightening the color of a fused fluorocarbon polymer coating by reducing the amount of carbonaceous residue in said coating, said method comprising mixing with the composition from which the coating is derived, before it is applied and fused, enough of at least one compound of at least one of the metals

| | |
|---|---|
| cobalt | cerium |
| iron | and |
| | manganese | which compound decomposes in the range of about 100° C.-500° C. to give at least 0.2%, by weight of the metal in the compound, of an oxide or hydroxide, to provide at least about 0.005 parts of metal per hundred of fluorocarbon polymer.

* * * * *